United States Patent
Ledeore et al.

(12) 
(10) Patent No.: US 6,270,538 B1
(45) Date of Patent: Aug. 7, 2001

(54) LUBRICATING OIL COMPOSITIONS

(75) Inventors: Christophe Ledeore, Et El (FR); Graham Jackson, Reading (GB); Robert Dryden Tack; Iain More, both of Abingdon (GB)

(73) Assignee: Exxon Chemical Patents INC, Linden, NJ (US)

(*) Notice: Subject to any disclaimer, the term of this patent is extended or adjusted under 35 U.S.C. 154(b) by 0 days.

(21) Appl. No.: 09/316,629

(22) Filed: May 21, 1999

(30) Foreign Application Priority Data

May 22, 1998 (GB) .................................................. 9810995

(51) Int. Cl.7 ................................. C10L 1/18; C10L 1/22; C10L 1/24
(52) U.S. Cl. ................................. 44/386; 44/369; 44/408; 44/410; 44/418; 44/419
(58) Field of Search ............................... 44/369, 385, 386, 44/408, 410, 423, 424, 418, 419

(56) References Cited

U.S. PATENT DOCUMENTS

| | | | |
|---|---|---|---|
| 2,499,367 | | 3/1950 | De Groote et al. .................. 252/342 |
| 3,846,481 | * | 11/1974 | Gaydasch . |
| 4,226,962 | | 10/1980 | Stolfo .................... 525/506 |
| 4,446,039 | | 5/1984 | Pindar et al. . |
| 5,094,666 | * | 3/1992 | Feldman et al. ......................... 44/410 |
| 5,108,462 | * | 4/1992 | Habeeb et al. .......................... 44/383 |
| 5,250,081 | * | 10/1993 | Habeeb et al. .......................... 44/412 |
| 5,667,539 | * | 9/1997 | Jackson et al. ......................... 44/410 |

FOREIGN PATENT DOCUMENTS

| | | | |
|---|---|---|---|
| 0 708 171 A2 | 4/1996 | (EP) | ................ C10M/159/20 |
| 430343 | 6/1935 | (GB) . | |
| WO95/33805 | 12/1995 | (WO) | ................ C10L/1/14 |
| WO96/18708 | 6/1996 | (WO) | ................ C10L/1/18 |
| WO98/16601 | 4/1998 | (WO) | ................ C10L/1/22 |
| WO99/25793 | 5/1999 | (WO) | ................ C10L/1/18 |

* cited by examiner

Primary Examiner—Margaret Medley

(57) ABSTRACT

Oils having improved low temperature properties and additives for use therein.

11 Claims, No Drawings

LUBRICATING OIL COMPOSITIONS

This invention relates to improved oil compositions and improved additives therefor, in particular to fuel oil compositions having improved lubricity and low temperature flow and especially filterability properties, and to additives enhancing a variety of fuel properties and providing operational advantages for fuel manufacturers and users.

Many oil, and particularly fuel oil, compositions suffer from the problem of reduced flowability and/or filterability at low temperatures, due to precipitation of the heavier alkanes (and particularly n-alkanes) inherent in such oils. This problem of alkane crystallisation at low temperatures is well known in the art. Additive solutions to this problem have been proposed for many years, in particular, copolymers of ethylene and vinyl esters such as vinyl acetate or vinyl propionate have been successfully used in commercial applications and are well documented in the patent literature.

The problem of poor low temperature filterability has conventionally been measured by the Cold Filter Plugging Point ("CFPP") test, which determines the ease with which fuel moves under suction through a filter grade representative of field equipment. The determination is repeated periodically during steady cooling of the fuel sample, the lowest temperature at which the minimum acceptable level of filterability is still achieved being recorded as the "CFPP" temperature of the sample. The details of the CFPP test and cooling regime are specified in the European Standard method EN116. the CFPP test is acknowledged as a standard bench test for determining fuel performance and, as such, has been adopted in many national fuel specifications. Such specifications set a number of minimum technical requirements for fuels of particular grades, so establishing a minimum quality level below which fuels are not considered technically "fit for purpose".

Ethylene copolymers have typically been used to achieve the desired CFPP performance of oils, especially middle distillate fuel oils, to such an extent that the use of such copolymers has become a standard refinery practice.

In recent years, other fuel performance requirements have grown in importance. In particular, the degree of settling of precipitating n-alkane crystals has an important influence on the tendency of such crystals to interrupt fuel supply. Other additives, known as "Wax Anti-Settling Additives", and typically based on oil soluble polar nitrogen-containing compounds, have been developed to reduce the rate of settling of precipitating n-alkanes and so enhance this aspect of fuel low temperature behaviour. Such additives are typically used in conjunction with the conventional CFPP enhancing ethylene polymers.

However, such combined usage has led to a further problem, namely that of "CFPP Regression". In brief, the addition of a typical polar nitrogen containing compound can, whilst improving the wax anti-settling character of the fuel, adversely affect the performance of the CFPP enhancing additive. As a notional example, a diesel fuel having a base CFPP (without additive) of −5° C. may, upon addition of an ethylene vinyl acetate copolymer, achieve a CFPP of −15° C. or even lower. Co-addition of a wax anti-settling additive may, whilst giving better dispersion of the crystals, worsen the CFPP for example to −10° C., i.e. a regression of 5° C. The net result of CFPP regression is that the fuel manufacturer may be forced (in order to meet the required minimum CFPP specification) either to use higher quantities of the ethylene polymer in order to offset the regression, or to reduce the amount of wax anti-settling additive and sacrifice settling performance accordingly.

A material has now been found which enhances the overall CFPP performance of a fuel and does not lead to CFPP regression when used in combination with other CFPP enhancing additives. Preferred embodiments can also enhance the wax anti-settling additive performance, so allowing the fuel manufacturer greater flexibility in meeting the required low temperature aspects of the fuel specification. The material can, when formulated within an additive composition or concentrate further comprising a polar nitrogen-containing additive, also improve the overall physical compatibility of the additive blend and accordingly reduce the need for high qualities of polar solvent and reduce or eliminate the CFPP regression associated with such components.

Recently, the advent of more stringent fuel oil sulphur specifications has led to a deterioration in fuel oil lubricity.

Environmental concerns have led to a need for fuels with reduced sulphur content, especially diesel fuel and kerosene. However, the refining processes that produce fuels with low sulphur contents also lower the content of other components in the fuel that contribute to its lubricity, for example, polycyclic aromatics and polar compounds. The result, has been an increase in reported failures of fuel pumps in diesel engines using low-sulphur fuels, the failure being caused by wear in, for example, cam plates, rollers, spindles and drive shafts.

This problem may be expected to become worse in future because, in order to meet stricter requirements on exhaust emissions generally, higher pressure fuel pumps and systems, including in-line, rotary and unit injector systems, are being introduced, these being expected to have more stringent lubricity requirements than present equipment.

At present, a typical sulphur content in a diesel fuel is about 0.05% by weight. In Sweden grades of fuel with levels below 0.005% (Class 2) and 0.001% (Class 1) are already being introduced. A fuel oil composition with a sulphur level below 0.05% by weight is referred to as a low sulphur fuel.

The material of this invention can also provide enhanced fuel lubricity, reducing or eliminating the need for a conventional lubricity additive whilst enabling the desired (or specified) fuel lubricity performance to be achieved, in addition to imparting improved low temperature properties.

Other advantages of the invention will become apparent from the following description.

U.S. Pat. No. 4,446,039 discloses compositions useful as additives for fuels and lubricants, made by reacting certain aromatic compounds such as substituted phenols with aldehyde or the equivalent thereof, non-amino hydrogen, active hydrogen compounds and the hydrocarbon based aliphatic alkylating agents.

In a first aspect, this invention provides an additive composition comprising the product obtainable by the condensation reaction between:

(i) at least one aldehyde or ketone or reactive equivalent thereof, and (ii) at least one compound comprising one or more aromatic moieties bearing at least one substituent of the formula —$XR^1$ and at least one further substituent —$R^2$, wherein:

X represents oxygen or sulphur, $R^1$ represents hydrogen or moiety bearing at least one hydrocarbyl group, and $R^2$ represents a hydrocarbyl group and contains less than 18 carbon atoms when a linear group, and (iii) at least one further compound comprising one or more aromatic moieties bearing at least one substituent of the formula —$XR^1$ and at least one further substituent —$R^3$ wherein:

X represents oxygen or sulphur, $R^1$ represents hydrogen or a moiety bearing at least one hydrocarbyl group, and $R^3$ represents a —COOH or —SO$_3$H group or a derivative thereof, and wherein X and $R^1$ in reactants (ii) and (iii) may be same or different.

In a second aspect, the invention provides an additive concentrate composition comprising the additive composition of the first aspect in admixture with a compatible solvent therefor.

In a third aspect, the invention provides a fuel oil composition comprising fuel oil and the additive or concentrate of the first or second aspect.

In a fourth aspect, the invention provides a process for the manufacture of the fuel oil composition of the third aspect, comprising:

(i) obtaining a fuel oil, and (ii) blending therewith either the additive or concentrate composition of the first or second aspect.

In a fifth aspect, the invention provides the use of the additive or concentrate composition of the first or second aspect in fuel oil, preferably to improve the fuel low temperature properties of lubricity properties or both.

In a sixth aspect, the invention provides a method of operating an oil refinery or fuel oil manufacturing facility comprising:

(i) manufacturing a fuel oil with low temperature properties insufficient to meet the required technical specification for that oil, (ii) improving such properties through the addition thereto of either the additive or concentrate composition of the first or second aspect such that the required specification is achieved.

In a seventh aspect, the invention provides the condensation reaction product defined in the first aspect.

Preferably, the product is combined with an amine bearing at least one hydrocarbyl, substituent. Such preferred embodiments provide good wax anti-settling performance, and further enhance the wax anti-settling properties of and other polar nitrogen compound present in the fuel oil, resulting in a fuel oil composition with excellent CFPP and wax anti-settling characteristics, and good corrosion resistance.

The additives of the first aspect of the invention show excellent performance and provide, in particular, excellent low temperature flow improvement (as measured, for example, by CFPP) and lubricity enhancement. Most preferably, the reaction product in the additive is combined with a hydrocarbyl amine as hereinafter described to give additives having the optimum balance of properties, including excellent CFPP and wax anti-settling enhancement, good lubricity performance, especially in fuels having sulphur contents of less than 0.05% by weight, such as 0.035% by weight or less, and good compatibility with other additives.

The various aspects of the invention will now be described in more detail as follows:

First Aspect of the Invention (Additive Composition)

The Product of the Condensation Reaction

Reactant (i) comprises one or more aldehydes or ketones or reactive equivalents thereof. By "reactive equivalent" is meant a material which generates an aldehyde under the conditions of the condensation reaction or a material which undergoes the required condensation reaction to produce moieties equivalent to those produced by an aldehyde. Typical reactive equivalents include oligomers or polymers of the aldehyde, acetals, or aldehyde solutions.

The aldehyde may be a mono- or di- aldehyde and may contain further —SO$_3$H functional groups, such as —COOH or —SO$_3$ groups capable of post-reaction in the product (b). The aldehyde preferably contains 1–28 carbon atoms, more preferably 1–20, such as 1–12, carbon atoms. The aldehyde is preferably aliphatic, such as an alkyl or alkenyl. The aldehyde (i) may comprise a mixture of different aldehydes.

Particularly preferred reactants (i) are formaldehyde, acetaldehyde, the butyraldehydes and substituted analogues or reactive equivalents thereof. Formaldehyde and glyoxylic acid (or pyruvic acid) are particularly preferred.

Reactant (ii) preferably comprises one or more compounds wherein each aromatic moiety bears one substituent of the formula —XR$^1$. More preferably, (ii) bears one substituent of the formula R$^2$ and most preferably, also one substituent of the formula —XR$^1$. X is preferably oxygen.

The or each aromatic moiety may consist exclusively of carbon and hydrogen or may comprise carbon, hydrogen and one or more hetero atoms. It will be understood that, to be capable of undergoing the condensation reaction with reactant (i), reactant (ii) comprises at least one hydrogen capable of being replaced during the reaction so as to allow formation of a carbon-carbon bond between reactant (i) and the reactant (ii). This hydrogen is preferably bonded to at least one aromatic moiety in the reactant (ii).

Preferred aromatic moieties are selected from the following:

(i) A single ring nucleus such as a benzene ring and (ii) A multi-ring aromatic nucleus. Such multi-ring nuclei can be of the fused type (e.g. naphthalene, anthracene, indolyl etc.) or they can be of the bridged type, wherein individual aromatic rings are linked through bridging links to each other. Such bridging linkages can be chosen from the group consisting of carbon-carbon single bonds, either linkages, sulfide linkages, polysulfide linkages of 2–6 sulphur atoms, sulfinyl linkages, sulfonyl linkages, methylene linkages, lower alkylene linkages, di(lower alkyl) methylene linkages, lower alkylene ether linkages, lower alkylene sulphide linkages, lower alkylene polysulfide linkages of 2–6 sulphur atoms, and mixtures of such bridging linkages.

When linkages are present in the aromatic nuclei, there are usually no more than five such linkages per nucleus; generally however the aromatic nuclei are single ring nuclei or fused ring nuclei of up to four rings.

Most preferably, the aromatic moiety is a benzene or substituted benzene nucleus.

$R^1$ may represent a moiety bearing a hydrocarbyl group, where hydrocarbyl is as defined below in relation to component (b). Preferably, the hydrocarbyl group in $R^1$ is an aliphatic group, such as alkenyl or alkyl group, which may be branched or preferably straight chain. The hydrocarbyl group in $R^1$ may be bonded directly to the oxygen or sulphur atom (represented by X in the formula —XR$^1$) or may be bonded directly by means of a functional group, for example on ester, ether, peroxide, anhydride or polysulphide linkage.

Preferably, where $R^1$ is hydrocarbyl, the hydrocarbyl group in $R^1$ contains 8–40 carbon atoms, more preferably 12–24 carbon atoms, such as 12–18 carbon atoms.

Most preferably, $R^1$ is hydrogen.

$R^2$ may independently represent those hydrocarbyl groups contemplated as forming part of the moiety $R^1$, although typically $R^1$ and $R^2$ (where both are present) will on any one aromatic moiety, will be different from each other, and may be the same or different on different aromatic moieties.

Preferably, $R^2$ is an alkenyl or, more preferably, alkyl group, most preferably containing less than 18 carbon atoms. It has been found that where $R^2$ contains 18 or more carbon atoms and is linear, the effectiveness of the product (c) as a low temperature performance enhancing additive is reduced. More preferably, $R^2$ is a branched chain group, preferably an alkyl group. Most preferred embodiments of $R^2$, for example 4 to 16 carbon atoms, include branched chain alkyl groups containing less than 16 carbon atoms, such as group containing 8, 9, 12 or 15 carbon atoms. Groups containing 9 carbon atoms are most preferred. Minor amounts of short chain alkyl groups (e.g. 4 carbons or less) may be present.

Reactant (ii) may be formed by the Friedel-Crafts reaction, in the presence of a suitable catalyst, such as boron trifluoride and its complexes with ether, phenol, hydrogen fluoride, and such as aluminum chloride or bromide. In this reaction, under conditions well known in the art, the aromatic moiety (substituted with group —$XR^1$) is reacted with the appropriate pre-cursor of the substituent $R^2$ (such as the corresponding $R^2$ halide) to form the desired reactant (ii).

In reactant (iii), the or each substituent —$XR^1$ may be the same or different to the or each substituent —$XR^1$ found on reactant (ii), although advantageously the substituents may both be —OH groups.

Preferably, (ii) and (iii) each bear one —$XR^1$ substituent and, more preferably, each bear one —OH substituent. In reactant (iii), the preferments of —X and $R^1$ are those already described in relation to reactant (ii), with the proviso that within an individual product (b) the substituents —$XR^1$ on units derived from (ii) and (iii) may be different.

Substituent $R^3$ is preferably —COOH or —$SO_3H$.

Optionally, the aromatic moiety in reactant (iii) may additionally bear one or more further substituents, for example of the formula —$R^2$, wherein $R^2$ is as described in relation to reactant (ii), with the proviso that within individual product (b) the substituents —$R^2$ on units derived from (ii) and (iii) may be different.

Most preferably, (iii) is salicyclic acid or a substituted derivative thereof, or p-hydroxy benzoic acid or a substituted derivative thereof.

The product of reaction may be obtained by the condensation reaction of (i), (ii) and (iii), generally conducted in the temperature range of about 30° to about 200° C., preferably about 80° C. to about 150° C. The reaction is generally accompanied by the production of water which is drawn from the reaction mixture, thus driving the reaction to completion. This can be accomplished by conventional techniques such as azeotropic distillation, vacuum distillation and so forth.

The times for the reaction and the intermediates formed thereby generally takes place in a period of time which is not critical and ranges from about 0.25 to about 48 hours, usually from about 1–8 hours.

A substantially inert, normally liquid organic solvent/diluent is often used in this reaction to lower the viscosity but its use is not absolutely necessary. Often excesses of one or more reactants can be used for this purpose. Useful organic solvent/diluents include lower alkanols, such as butyl and arnyl alcohols, aromatic hydrocarbons such as benzene, toluene, xylene and higher alkyl benzenes; aliphatic hydrocarbons such as decane, dodecane; kerosene mineral oil; etc. and mixtures of two or more of any such conventional solvent/dilents. As will be apparent, a "substantially inert" solvent/diluent is one which does not react with the reactants or products in any significant amount and, preferably, not at all.

The reaction of aldehyde (i) with (ii) and (iii) is usually catalyzed by a base or an acid; preferably catalyzed with an acidic catalyst such as p-toluene suphonic acid. Suitable basic catalysts include tetramethyl ammonium hydroxide, ammonium hydroxide. Up to one mole of catalyst for each mole of aldehyde present can be used, normally about 0.05–0.5 mole of catalyst per mole of (i) and (iii) is used. It is usually preferable to neutralize a basic catalyst with a low molecular weight organic or inorganic acid before proceeding further. However, such neutralization is not necessary. Useful acids for accomplishing such neutralizations include the lower alkanoic acids, such as formic acid and acetic acid, and inorganic acids such as sulfuric, hydrochloric, phosphoric, nitric acid and the like.

It is believed that the compositions of this invention contain bridges derived from the organic residue of the aldehyde linking the organic residues of the aromatic compound. Thus, when (i) is formaldehyde, methylene bridges are formed. The invention, however, is in now way intended to be limited by reference to such bridges. The formation of bridges may lead to linear or cyclic macromolecules containing units of (ii) and (iii).

A stirred mixture of 40 g branched nonylphenol, 3.1 g salicyclic acid, 6.44 g of 95% paraformaldehyde and 0.1 g p-toluene sulphonic acid monohydrate in 50 ml xylene was heated to 80–85° C. for two hours, followed by reflux at 150–155° C. for six hours, the water of reaction being continuously removed via a Dean and Stark receiver. The resulting nonylphenol-formaldehyde-salicylic acid condensation product has an Mn of 1960 and an Mw of 2900.

One product typically has a number-average molecular weight (Mn), as measured by GPC against polystyrene standards, in the range of 500 to 10,000, preferably 500 to 5,000, more preferably 500 to 2,500. The molecular weight distribution (Mw/Mn—both determined via GPC) is advantageously in the range of 1 to 2, more preferably 1 to 1.5, such as 1.3 to 1.4.

Alternatively, the product may be obtained by the reaction of (i) and (ii) to form a condensation product, followed by further reaction with (iii) to form a product wherein the units derived from (iii) are for example, predominantly terminally positioned. An example was prepared by heating a stirred mixture of 40 g nonylphenol, 5.5 g of 95% paraformaldehyde and 0.1 g p-toluene sulphonic acid monohydrate in 50 ml xylene to 80–85° C. for four hours, followed by addition thereto of 3.1 g salicylic acid reflux for five hours at 152–158° C. The water of reaction was continuously removed via a Dean and Stark receiver. The resulting nonyl-phenol-formaldehyde-salicylic acid condensation product has an Mn of 1540 and an Mw of 2200.

Alternatively, (b) may be obtained by the reaction of (i) and (ii) to form a condensation product, followed by partial carboxylation or sulphonation such that some units derived from (ii) are converted in situ into units having structures corresponding to those of (iii). Such products also fall within the scope of this invention.

More preferably, the products obtainable from reaction of (i), (ii) and (iii) are combined with at least one amine. In such products, the amine is preferably reacted with the substituents of the formula —$R^3$, e.g. the —COOH or —$SO_3H$ groups, so as to form the amine salt derivatives thereof; although salt formation may additionally occur via any —OH substituents.

The product may be combined with at least one amine bearing at least one hydrocarbyl substituent. Such combination may be purely by admixture, but is preferably by physical or chemical associated or complexation. More preferably the product is reacted with at least one amine, more preferably to form the amine salt derivative thereof.

The amine may contain three or four, or preferably one or two, hydrocarbyl sustituents. Amines with two substituents are most preferred. The substituents may be aliphatic, for example alkyl or alkenyl groups, and may contain up to 40 carbon atoms, for example up to 28 carbon atoms. Straight-chain alkyl groups, for example having 12 to 28, preferably 12 to 20, carbon atoms are most preferred.

Particularly useful amines include dicocoamine, di-hydrogenated tallowamine, and mixtures thereof.

Preferred as the product are embodiments obtainable from at least one alkyl phenol (ii) wherein the alkyl substituent contains no more than 15 carbon atoms, (i) formaldehyde or a reactive equivalent thereof, and (iii) salicylic acid, and wherein the amine is an alkyl or dialkyl amine, preferably as described above and more preferably selected from dihydrogenated tallowamine, dicocoamine, and mixtures thereof.

The additive composition of the first aspect preferably contains additional additive components and is obtainable, and preferably obtained, by admixture of these components with the reaction product. The admixture may for example be achieved by blending together the components in a suitable vessel, or for example by injection of one or more components into the other. Where injection on blending is used, all components may be admixed at the same point and time, or at different points and times in the additive blending facility.

In this specification, the expression "obtainable by admixture" refers both to compositions in which the components exist discretely in their individual forms, and also to compositions in which, after admixture, interaction between one or more of the components (including, where present, further optional additive components) such as complexation or other in-situ physical or chemical association leads to a loss of the discrete identity of the individual components, but without detracting significantly from the performance of the additive composition. Similarly, the additive compositions of the first aspect may be obtained by the admixture of precursors to the components and subsequent reaction to form the desired components in-situ in the additive composition.

Preferred additional additive components include:

(a) Ethylene Polymer(s)

Each polymer may be a homopolymer or a copolymer of ethylene with another unsaturated monomer. Suitable co-monomers include hydrocarbon monomers such as propylene, n- and i- butylene and the various α-olefins known in the art, such as decene-1, dodecene-1, tetradecene-1, hexadecene-1 and octadecene-1.

Preferred co-monomers are unsaturated ester or either monomers, with ester monomers being more preferred.

Preferred ethylene unsaturated ester copolymers have, in addition to units derived from ethylene, units of the formula:

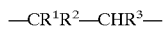

wherein $R^1$ represents hydrogen or methyl, $R^2$ represents —$COOR^4$, wherein $R^4$ represents an alkyl group having from 1–12, preferably 1–9 carbon atoms, which is a straight chain, or, if it contains 3 or more carbon atoms, branched, or $R^2$ represents $OOCR^5$, wherein $R^5$ represents $R^4$ or H, and $R^3$ represents H or $COOR^4$.

These may comprise a copolymer of ethylene with an ethylenically unsaturated ester, or derivative thereof. An example is a copolymer of ethylene with an ester of a saturated alcohol and an unsaturated carboxylic acid, but preferably the ester is one of an unsaturated alcohol with a saturated carboxylic acid. An ethylene vinyl ester copolymer is advantageous; an ethylene vinyl acetate, ethylene vinyl propionate, ethylene vinyl hexanoate, ethylene vinyl 2-ethylhexanoate, ethylene vinyl octanoate or ethylene vinyl versatate copolymer is preferred. Preferably, the copolymer contains from 5 to 40 wt % of the vinyl ester, more preferably from 10 to 35 wt % vinyl ester. A mixture of two copolymers, for example as described in U.S. Pat. No. 3,961,916, may be used. The number average molecular weight of the copolymer, as measured by vapour phase osmometry, is advantageously 1,000 to 10,000, preferably 1,000 to 5,000. If desired, the copolymer may contain units derived from additional comonomers, e.g. a terpolymer, tetrapolymer or a higher polymer, for example where the additional comonomer is isobutylene or disobutylene, or a further unsaturated ester.

The copolymers may be made by direct polymerization of comonomers, or by transesterification, or by hydrolysis and re-esterification, of an ethylene unsaturated ester copolymer to give a different ethylene unsaturated ester copolymer. For example, ethylene vinyl hexanoate and ethylene vinyl octanoate copolymers may be made in this way, e.g. from an ethylene vinyl acetate copolymer.

Within the meaning of this specification, "copolymer" refers to a polymer obtained from two or more different co-monomers.

Most preferably, (a) comprises an ethylene vinyl acetate or ethylene vinyl propionate copolymer, or a mixture thereof, or a terpolymer of ethylene and two vinyl esters, each giving rise to polymer units corresponding to the above formula. Particularly preferred are terpolymers of ethylene, vinyl acetate and a third unsaturated ester monomer, for example, selected from vinyl propionate, vinyl 2-ethyl hexanoate, or vinyl versatate.

(b) The Oil Soluble Polar Nitrogen Compound

Such compounds carry one or more, preferably two or more, substituents of the formula>$NR^{13}$, where $R^{13}$ represents a hydrocarbyl group containing 8–40 carbon atoms, which substituent or one or more of which substituents may be in the form of a carbon delivered therefrom. $R^{13}$ preferably represents an aliphatic hydrocarbyl group containing 12–24 carbon atoms. The oil soluble polar nitrogen compound is capable of acting as a wax crystal growth inhibitor in fuels.

Preferably, the hydrocarbyl group is linear or slightly linear, i.e. it may have one short length (1–4 carbon atoms) hydrocarbyl branch. When the substituent is amino, it may carry more than one said hydrocarbyl group, which may be the same or different.

The term, "hydrocarbyl" as used in this specification refers to a group having a carbon atom directly attached to the rest of the molecule and having a hydrocarbon or predominantly hydrocarbon character. Examples include hydrocarbon groups, including aliphatic (e.g. alkyl or alkenyl), alicyclic (e.g. cycloalkyl or cycloakenyl), aromatic, and alicyclic substituted aromatic, and aromatic substituted aliphatic and alicyclic groups. Aliphatic groups are advantageously saturated and more preferably linear. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred.

Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulphur, and, preferably, oxygen.

The polar nitrogen compound may comprise one or more amino or imino substituents. More especially, the or each amino or imino substituent is bonded to a moiety via an intermediate linking group such as —CO—, —CO$_2^{(-)}$, —SO$_3^{(-)}$ or hydrocarbylene. Where the linking group is anionic, the substituent is part of a cationic group, as in an amine salt group.

When the polar nitrogen compound carries more than one amino or imino substituent, the linking groups for each substituent may be the same or different.

Suitable amino substituents are long chain $C_{12}$–$C_{40}$, preferably $C_{12}$–$C_{24}$, alkyl primary, secondary, tertiary or quaternary amino substituents.

Preferably, the amino substituent is a dialkylamino substituent, which, as indicated above, may be in the form of an amine salt thereof; tertiary and quaternary amines can form only amine salts. Said alkyl groups may be the same or different.

Examples of amino substituents include dodecylamino, tetradecylamino, cocoamino, and hydrogenated tallow amino. Examples of secondary amino substituents include dioctadecylamino and methylbehenylamino. Mixtures of amino substituents may be present such as those derived from naturally occurring amines. Preferred amino substituents are the secondary hydrogenated tallow amino substituent, the alkyl groups of which are derived from hydrogenated tallow fat and are typically composed of approximately 4% $C_{14}$, 31% $C_{16}$ and 59% $C_{18}$ n-alkyl groups by weight, and the dicocoamino substituent, composed predominantly of $C_{12}$ and $C_{14}$ n-alkyl groups.

Suitable imino substituents are long chain $C_{12}$–$C_{40}$, preferably $C_{12}$–$C_{24}$, alkyl substituents.

Said polar nitrogen compound is preferably monomeric (cyclic or non-cyclic) or aliphatic polymeric, but is preferably monomeric. When non-cyclic, it may be obtained from a cyclic precursor such as an anhydride or a spirobisiactone.

The cyclic ring system of the compound may include homocyclic, heterocyclic, or fused polycyclic assemblies in which the cyclic assemblies may be the same or different. Where there are two or more such cyclic assemblies, the substituents may be on the same or different assemblies, preferably on the same assembly. Preferably, the or each cyclic assembly is aromatic, more preferably a benzene ring. Most preferably, the cyclic ring system is a single benzene ring when it is preferred that the substituents are in the ortho or meta positions, which benzene ring may be optionally further substituted.

The ring atoms in the cyclic assembly or assemblies are preferably carbon atoms but may for example include one or more ring N, S or O atom, in which case or cases the compound is a heterocyclic compound.

Examples of such polycyclic assemblies include:
(i) Condensed benzene structures such as naphthalene, anthracene, phenanthrene, and pyrene.
(ii) Condensed ring structures where none of or not all of the rings are benzene such as azulene, indene, hydroindene, fluorene, and diphenylene oxides,
(iii) Rings joined "end-on" such as diphenyl,
(iv) Heterocyclic compounds such as quinoline, indole, 2:3 dihydroindole, benzofuran, coumarin, isocoumarin, benzothiophen, carbazole and thiodiphenylamine,
(v) Non-aromatic or partially saturated ring systems such as decalin (i.e. decahydronaphthalene), α-pinene, cardinene, and bornylene, and
(vi) Three-dimensional structures such as norbornene, bicycloheptane (i.e. norbornane), bicyclooctane, and bicyclooctene.

Examples of polar nitrogen compounds are described below:
(i) Amine salts and/or amides of mono- or poly- carboxylic acids or reactive equivalents thereof (e.g. anhydrides), e.g. having 1–4 carboxylic acid groups. Each may be made, for example, by reacting at least one molar proportion of a hydrocarbyl substituted amine with a molar proportion of the acid or its anhydride.

When an amide is formed, the linking group is —CO—; when an amine salt is formed, the linking group is —CO$_2^{(-)}$.

The acid may be cyclic or non-cyclic. Examples of cyclic moieties are those where the acid is cyclohexane 1,2-dicarboxylic acid; cyclohexane 1,2-dicarboxylic acid; cyclopentane 1,2-dicarboxylic acid; and naphthalene dicarboxylic acid. Generally, such acids have 5–13 carbon atoms in the cyclic moiety. Preferred such cyclic acids are benzene dicarboxylic acids such as phthalic acid, isophthalic acid, and terephthalic acid, and benzene tetracarboxylic acids such as pyromelletic acid, phthalic acid being particularly preferred. U.S. Pat. No. 4,211,534 and EP-A-272,889 describe polar nitrogen compounds containing such moieties.

Examples of non-cyclic acids are those when the acid is a long chain alkyl or alkylene substituted dicarboxylic acid such as a succinic acid, as described in U.S. Pat. No. 4,147,520 for example.

Other examples of non-cyclic acids are those where the acids are nitrogen containing acids, for example alkylene diamine tetra acetic an-propionic acids such as ethylene diamine tetra acetic acid, an nitriloacetic acid, as described in DE-A-3,916,366.

Further examples are the moieties obtained where a dialkyl spirobislactone is reacted with an amine, as described in EP-A-413,279.

(ii) Polar nitrogen compounds of the general formula:

$$\begin{array}{c} A \diagdown \phantom{X}X\!\!-\!\!R^1 \\ C \\ | \\ C \\ B \diagup \phantom{Y}Y\!\!-\!\!R^2 \end{array}$$

in which —Y—R$^2$ is SO$_3^{(-)(+)}$NR$_3$R$^2$, —SO$_3^{(-)(+)}$HNR$_2^3$R$^2$, —SO$_3^{(-)(+)}$H$_2$NR$^3$R$^2$, —SO$_3^{(-)(+)}$H$_3$NR$^2$, —SO$_2$NR$^3$R$^2$ or —SO$_3$R$^2$; and —X—R$^1$ is —Y—R$^2$ or —CONR$^3$R$^1$, —CO$_2^{(-)(+)}$NR$_3^3$R$^1$, —CO$_2^{(-)(+)}$HNR$_2^3$R$^1$, —R$^4$—COOR$_1$, —NR$^3$COR$^1$, —R$^4$OR$^1$, —R$^4$OCOR$^1$, —R$^4$,R$^1$, —N(COR$^3$)R$^1$ or Z$^{(-)(+)}$NR$_{33}$R$^1$; —Z$^{(-)}$ is SO$_3^{(-)}$ or —CO$_2^{(-)}$;

R$^1$ and R$^2$ are alkyl, alkoxyalkyl or polyalkoxyalkyl containing at least 10 carbon atoms in the main chain.

R$^3$ is hydrocarbyl and each R$^3$ may be the same or different and R$^4$ is absent or is C$_1$ to C$_5$ alkylene and in:

$$\begin{array}{c} A \diagdown \\ C \\ | \\ C \\ B \diagup \end{array}$$

the Carbon-Carbon (C—C) bond is either:
(a) Ethylenically unsaturated when A and B may be akyl, alkenyl or substituted hydrocarbyl groups or,
(b) Part of a cyclic structure which may be aromatic, polynuclear aromatic or cyclo-aliphatic, it is preferred that X-R$^1$ and Y-R$^2$ between them contain at least three alkyl, alkoxyalkyl or polyalkoxyalkyl groups.

Multicomponent additive systems may be used and the ratios of additives to be used will depend on the fuel to be treated.

(iii) Amines or diamine salts of:
  (a) A sulphosuccinic acid,
  (b) An ester or diester of a sulphosuccinic acid,
  (c) An amide or a diamide of a sulphosuccinic acid, or
  (d) An ester amide of a sulphosuccinic acid.

(iv) Chemical compounds comprising or including a cyclic ring system, the compound carrying at least two substituents of the general formula (I) below on the ring system:

$$—A—NR^1R^2 \quad (I)$$

where A is an aliphatic hydrocarbyl group that is optionally interrupted by one or more hetero atoms and that is straight chain or branched, and R$^1$ and R$^2$ are the same or different and each is independently a hydrocarbyl group containing 9–40 carbon atoms optionally interrupted by one or more hetero atoms, the substituents being the same or different and the compound optionally being in the form of a salt thereof.

Preferably, A has from 1–20 carbon atoms and is preferably a methylene or polymethylene group.

Each hydrocarbyl group constituting R$^1$ and R$^2$ in the invention (Formula 1) may for example be an alkyl or alkylene group or a mono- or poly-alkoxyalkyl group. Preferably, each hydrocarbyl group is a straight chain alkyl group. The number of carbon atoms in each hydrocarbyl group is preferably 16–40, more preferably 16–24.

Also, it is preferred that the cyclic system is substituted with only two substituents of the general formula (I) and that A is a methylene group.

Examples of salts of the chemical compounds are the acetate and the hydrochloride.

The compounds may conveniently be made by reducing the corresponding amide, which may be made by reacting a secondary amine with the appropriate acid chloride. WO 9407842 describes other compounds (Mannich bases) in this classification.

(v) A condensate of long chain primary or secondary amine with an aliphatic carboxylic acid-containing polymer, such as a polymer of maleic anhydride and one or more unsaturated monomers, for example ethylene or another α olefin such as C$_6$–C$_{30}$ α olefin.

Specific examples include polymers such as described in GB-A-2,121,807, FR-A-2,592,387 and DE-A-3,941,561; and also esters of telemer acid and alkanoloamines such as described in U.S. Pat. No. 4,639,256; and the reaction product of an amine containing a branched carboxylic acid ester, an epoxide and a mono-carboxylic acid polyester such as described in U.S. Pat. No. 4,631,071.

EP-0,283,292 describes amide containing polymers; EP-0,343,981 describes: amine salt containing polymers.

It should be noted that the polar nitrogen compounds may contain other functionality such as ester functionality.

The most preferred polar nitrogen compounds are those wax anti-settling additives comprising the amides and/or amine salts, or mixtures thereof, of aromatic or aliphatic polycarboxylic acid (or reactive equivalents thereof) and alkyl or dialkyl amines, such as those formed from the following:

(i) Benzene dicarboxylic acids (or anhydrides thereof), such as phthalic anhydride,
  (ii) Alkylene di- or polyamine tetraacetic or tetra propionic acids, such as EDTA (Ethylene Diamine Tetraacetic Acid), and
  (iii) Alkyl or alkenyl substituted succinic acids.

The preferred amines include dialkyl amines having 10–30, preferably 12–20 carbon atoms in each alkyl chain, for example dihydrogenated tallow amine or dicocamine, or mixtures thereof.

Compounds resulting from the reaction of phthalic anhydride and dialkyl amines, such as those specified above, are most preferred.

Preferably, the composition of the first, second and third aspects comprise at least one reaction product and at least one ethylene polymer (a). Such compositions provide particularly good low temperature flow and filterability enhancement, and excellent lubricity performance.

More preferably, the composition of the first, second and third aspects further comprise at least one polar nitrogen compound. Such compositions provide further enhanced wax anti-settling and lubricity performance, and may also improve further other low temperature properties of the fuel oil.

Co-additives

The additive composition may additionally comprise one or more co-additives useful in fuel oil compositions. Such co-additives include other cold flow improving additives, such as one or more additives selected for the following classes:

(i) comb polymers
  (ii) linear ester, ether, ester/ethers and mixtures thereof;
  (iii) non-ethylene hydrocarbon polymers, and
  (iv) hydrocarbylated aromatic compounds.

Such co-additives are described in more detail below.

(i) Generally, comb polymers consist of molecules in which long chain branches such as hydrocarbyl branches, optionally interrupted with one or more oxygen atoms and/or carbonyl groups, having from 12 to 30 such as 14 to 20, carbon atoms, are pendant from a polymer backbone, said branches being bonded directly or indirectly to the backbone. Examples of indirect bonding include bonding via interposed atoms or groups, which bonding can include covalent and/or electrovalent bonding such as in a salt. Generally, comb polymers are distinguished by having a minimum molar proportion of units containing such long chain branches.

Advantageously, the comb polymer is a homopolymer having, or a copolymer at least 25 and preferably at least 40, more preferably at least 50, molar per cent of the units of which have, side chains containing at least 12 atoms, selected from for example carbon, nitrogen and oxygen, in a linear chain or a chain containing a small amount of branching such as a single methyl branch.

As examples of preferred comb polymers there may be mentioned those containing units of the general formula

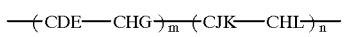

wherein
  D represents R$^{11}$, COOR$^{11}$, OCOR$^{11}$, R$^{12}$COOR$^{11}$ or OR$^{11}$;
  E represents H, D or R$^{12}$;
  G represents H or D;
  J represents H, R$^{12}$, R$^{12}$COOR$^{11}$, or a substituted or unsubstituted aryl or heterocyclic group;
  K represents H, COOR$^{12}$, OCOR$^{12}$, OR$^{12}$ or COOH;

L represents H, $R^{12}COOR^{12}$, $OCOR^{12}$ or substituted or unsubstituted aryl;

$R^{11}$ representing a hydrocarbyl group having 12 or more carbon atoms, and $R^{12}$ representing a hydrocarbyl group being divalent in the $^{12}COOR^{11}$ group and otherwise being monovalent, and m and n represent mole ratios, their sum being 1 and m being finite and being up to and including 1 and n being from zero to less than 1, preferably m being within the range of from 1.0 to 0.4, n being in the range of from 0 to 0.6. $R^{11}$ advantageously represents a hydrocarbyl group with from 12 to 30 carbon atoms, preferably 12 to 24, more preferably 12 to 18. Preferably, $R^{11}$ is a linear or slightly branched alkyl group and $R^{12}$ advantageously represents a hydrocarbyl group with from 1 to 30 carbon atoms when monovalent, preferably with 6 or greater, more preferably 10 or greater, preferably up to 24, more preferably up to 18 carbon atoms. Preferably, $R^{12}$, when monovalent, is a linear or slightly branched alkyl group. When $R^{12}$ is divalent, it is preferably a methylene or ethylene group. By "slightly branched" is meant having a single methyl branch.

The comb polymer may contain units derived from other monomers if desired or required, examples being CO, vinyl acetate and ethylene. It is within the scope of the invention to include two or more different comb copolymers.

The comb polymers may, for example, be copolymers of maleic anhydride or fumaric acid and another ethylenically unsaturated monomer, e.g. an α-olefin or an unsaturated ester, for example, vinyl acetate as described in EP-A-214, 786: It is preferred but not essential that equimolar amounts of the comonomers be used although molar properties in the range of 2 to 1 and 1 to 2 are suitable. Examples of olefins that may be copolymerized with e.g. maleic anhydride, include 1-dodecene, 1-tetradecene, 1-hexadecene, 1-octadecene, and styrene. Other examples of comb polymer include methacrylates and acrylates.

The copolymer may be esterified by any suitable technique and although preferred it is not essential that the maleic anhydride or fumaric acid be at least 50% esterified. Examples of alcohols which may be used include n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol as described in EP-A-213,879. The alcohol may be a mixture of normal and single methyl branched alcohols. It is preferred to use pure alcohols rather than alcohol mixtures such as may be commercially available; if mixtures are used the number of carbon atoms in the alkyl group is taken to be the average number of carbon atoms in the alkyl groups of the alcohol mixture; if alcohols that contain a branch at the 1 or 2 positions are used the number of carbon atoms in the alkyl group is taken to be the number in the straight chain backbone segment of the alkyl group of the alcohol.

The comb polymers may especially be fumarate or itaconate polymers and copolymers such as for example those described in European Patent Applications 153 176, 153 177, 156 577 and 225 688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight. The particularly preferred fumarate comb polymers may, for example, have a number average molecular weight in the range of 1,000 to 100,000, preferably 1,000 to 50,000, as measured by Vapour Phase Osmometry (VPO).

Other suitable comb polymers are the polymers and copolymers of α-olefins and esterified copolymers of styrene and maleic anhydride, and esterified copolymers of styrene and fumaric acid as described in EP-A-282,342; mixtures of two or more comb polymers may be used in accordance with the invention and, as indicated above; such use may be advantageous.

Other examples of comb polymers are hydrocarbon polymers such as copolymers of ethylene and at least one α-olefin, preferably the α-olefin having at most 20 carbon atoms, examples being n-dodecene-1, n-tetradecene-1 and n-hexadecene-1 (for example, as described in WO9319106). Preferably, the number average molecular weight measured by Gel Permeation Chromatography against polystyrene standards of such a copolymer is for example, up to 30,000 or up to 40,000. The hydrocarbon copolymers may be prepared by methods known in the art, for example using a Ziegler type catalyst. Such hydrocarbon polymers may for example have an isotacticity of 75% or greater.

(ii) Such compounds comprise an ester, ether, ester/ether compound or mixtures thereof in which at least one substantially linear alkyl group having 10 to 30 carbon atoms is connected via an optional linking group that may be branched to a non-polymeric residue, such as an organic residue, to provide at least one linear chain of atoms that includes the carbon atoms of said alkyl groups and one or more non-terminal oxygen, sulphur and/or nitrogen atoms. The linking group may be polymeric.

By "substantially linear" is meant that the alkyl group is preferably straight chain, but that straight chain alkyl groups having a small degree of branching such as in the form of a single methyl group branch may be used.

Preferably, the compound has at least two of said alkyl groups when the linear chain may include the carbon atoms of more than one of said alkyl groups. When the compound has at least three of said alkyl groups, there may be more than one of such linear chains, which chains may overlap. The linear chain or chains may provide part of the linking group between any two such alkyl groups in the compound.

The oxygen atom or atoms, if present, are preferably directly interposed between carbon atoms in the chain and may, for example, be provided in the linking group, if present in the form of a mono- or poly-oxyalkylene group, said oxyalkylene group preferably having 2 to 4 carbon atoms, examples being oxyethylene and oxypropylene.

As indicated the chain or chains include carbon, oxygen, sulphur and/or nitrogen atoms.

The compound may be an ester where the alkyl groups are connected to the remainder of the compounds as —O—CO n alkyl, or —CO—O n alkyl group, in the former the alkyl groups being derived from an acid and the remainder of the compound being derived from a polyhydric alcohol and in the latter the alkyl groups being derived from an alcohol and the remainder of the compound being derived from a polycarboxylic acid. Also, the compound may be an ether where the alkyl groups are connected to the remainder of the compound as -O-n-alkyl groups. The compound may be both an ester and an ether or it may contain different ester groups.

Examples include polyoxyalkylene esters, ethers, ester/ethers and mixtures thereof, particularly those containing at least one, preferably at least two, $C_{10}$ to $C_{30}$ linear alkyl groups and a polyoxyalkylene glycol group of molecular weight up to 5,000, preferably 200 to 5,000, the alkylene group in said polyoxyalkylene glycol containing from 1 to 4 carbon atoms.

The preferred esters, ethers or ester/ethers which may be used may comprise compounds in which one or more groups (such as 2, 3 or 4 groups) of formula —$OR^{25}$ are bonded to a residue E, where E may for example represent A (alkylene) q, where A represents carbon or nitrogen or is absent, q represents an integer from 1 to 4, and the alkylene group has from one to four carbon atoms, A (alkylene)q for example using $N(CH_2CH_2)_3$; $C(CH_2)_4$; or $(CH_2)_2$; and $R^{25}$ may independently be (a) n-alkyl-
(b) n-alkyl-CO-
(c) n-alkyl-OCO-$(CH_2)_n$-
(d) n-alkyl-OCO-$(CH_2)_n$COn being, for example, 1 to 34, the alkyl group being linear and containing from 10 to 30 carbon atoms. For example, they may be represented by the formula $R^{23}OBOR^{24}$, $R^{23}$ and $R^{24}$ each being defined as for $R^{25}$ above, and B representing the polyalkylene segment of the glycol in which the alkylene group has from 1 to 4 carbon atoms, for example, polyoxymethylene, polyoxyethylene or polyoxytrimethylene moiety which is substantially linear; some degree of branching with lower alkyl side chains (such as in polyoxypropylene glycol) may be tolerated but it is preferred that the glycol should be substantially linear.

Suitable glycols generally are substantially linear polyethylene glycols (PEG) and polypropylene glycols (PPG) having a molecular weight of about 100 to 5,000, preferably about 200 to 2,000. Esters are preferred and fatty acids containing from 10 to 30 carbon atoms are useful for reacting with the glycols to form the ester additives, it being preferred to use $C_{18}$ to $C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred when the petroleum based component is a narrow boiling distillate, when minor amounts of monoethers and monoesters (which are often formed in the manufacturing process) may also be present. It is important for active performance that a major amount of the dialkyl compound is present. In particular, stearic or behenic diesters of polyethylene glycol, polypropylene glycol or polyethylene/polypropylene glycol mixtures are preferred.

Other suitable esters are those obtainable by the reaction of (i) an aliphatic monocarboxylic acid having 10 to 40 carbon atoms, and
(ii) an alkoxylated aliphatic monohydric alcohol, wherein the alcohol has greater than 18 carbon atoms prior to alkoxylation and wherein the degree of alkoxylation is 5 to 30 moles of alkylene oxide per mole of alcohol.

The ester may be formed from a single acid reactant (i) and single alcohol reactant (ii), or from mixtures of acids (i) or alcohols (ii) or both. In the latter cases, a mixture of ester products will be formed which may be used without separation if desired, or separated to give discrete products before use.

The degree of alkoxylation of the aliphatic monohydric alcohol is preferably 10 to 25 moles of alkylene oxide per mole of alcohol, more preferably 15 to 25 moles. The alkoxylation is preferably ethoxylation, although propoxylation or butoxylation can also be used successfully. Mixed alkoxylation, for example a mixture of ethylene and propylene-oxide units; may also be used.

The acid reactant (i) preferably has 18 to 30 carbon atoms, more preferably 18 to 22 carbon atoms such as 20 or 22 carbon atoms. The acid is preferably a saturated aliphatic acid, more preferably an alkanoic acid. Alkanoic acids of 18 to 30 carbon atoms are particularly useful. n-Alkanoic acids are preferred. Such acids include behenic acid and arachidic acid, with behenic acid being preferred. Where mixtures of acids are used, it is preferred that the average number of carbon atoms in the acid mixture lies in the above-specified ranges and preferably the individual acids within the mixture will not differ by more than 8 (and more preferably 4) carbon numbers.

The alcohol reactant (ii) is preferably derived from an aliphatic monohydric alcohol having no more than 28 carbon atoms, and more preferably no more than 26 (or better, 24) carbon atoms, prior to alkoxylation. The range of 20 to 22 is particularly advantageous for obtaining good wax crystal modification. The aliphatic alcohol is preferably a saturated aliphatic alcohol, especially an alkanol (i.e. alkyl alcohol). Alkanols having 20 to 28 carbon atoms, and particularly 20 to 26, such as 20 to 22 carbon atoms are preferred. n-Alkanols are most preferred, particularly those having 20 to 24 carbon atoms, and preferably 20 to 22 carbon atoms.

Where the alcohol reactant (ii) is a mixture of alcohols, this mixture may comprise a single aliphatic alcohol alkoxylated to varying degrees, or a mixture of aliphatic alcohols alkoxylated to either the same or varying degrees. Where a mixture of aliphatic alcohols is used, the average carbon number prior to alkoxylation should be above 18 and preferably within the preferred ranges recited above. Preferably, the individual alcohols in the mixture should not differ by more than 4 carbon atoms.

The esterification can be conducted by normal techniques known in the art. Thus, for example one mole equivalent of the alkoxylated alcohol is esterified by one mole equivalent of acid by azeotroping in toluene at 110–120° C. in the presence of 1 weight percent of p-toluene sulphonic acid catalyst until esterification is complete, as judged by Infra-Red Spectroscopy and/or reduction of the hydroxyl and acid numbers.

The alkoxylation of the aliphatic alcohol is also conducted by well-known techniques. Thus for example a suitable alcohol is (where necessary) melted at about 70° C. and 1 wt % of potassium ethoxide in ethanol added, the mixture thereafter being stirred and heated to 100° C. under a nitrogen sparge until ethanol ceases to be distilled off, the mixture subsequently being heated to 150° C. to complete formation of the potassium salt. The reactor is then pressurised with alkylene oxide until the mass increases by the desired weight of alkylene oxide (calculated from the desired degree of alkoxylation). The product is finally cooled to 90° C. and the potassium neutralised (e.g. by adding an equivalent of lactic acid).

(iii) The non-ethylene hydrocarbon polymer may be an oil-soluble hydrogenated block diene polymer, comprising at least one crystallizable block, obtainable by end-to-end polymerisation of a linear diene, and at least one non-crystallizable block, the non-crystallizable block being obtainable by 1,2-configuration polymerisation of a linear diene, by polymerisation of a branched diene, or by a mixture of such polymerisations.

Advantageously, the block copolymer before hydrogenation comprises units derived from butadiene only, or from butadiene and at least one comonomer of the formula

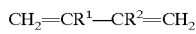

$$CH_2=CR^1—CR^2=CH_2$$

wherein $R^1$ represents a $C_1$ to $C_6$ alkyl group and $R^2$ represents hydrogen or a $C_1$ to $C_6$ alkyl group. Advantageously the total number of carbon atoms in the comonomer is 5 to 8, and the comonomer is advantageously isoprene. Advantageously, the copolymer contains at least 10% by weight of units derived from butadiene.

(iv) These materials are condensates comprising aromatic and hydrocarbyl parts. The aromatic part is conveniently an aromatic hydrocarbon which may be unsubstituted or substituted with, for example, non-hydrocarbon substituents. Such aromatic hydrocarbon preferably contains a maximum of these substituent groups and/or three condensed rings, and is preferably naphthalene. The hydrocarbyl part is a hydrogen and carbon containing part connected to the rest of the molecule by a carbon atom. It may be saturated or unsaturated, and straight or branched, and may contain one or more hetero-atoms provided they do not substantially affect the hydrocarbyl nature of the part. Preferably the hydrocarbyl part is an alkyl part, conveniently having more than 8 carbon atoms.

In addition, the additive composition may comprise one or more other conventional co-additives known in the art, such as detergents, antioxidants, corrosion inhibitors, dehazers, demulsifiers, metal deactivators, antifoaming agents, cetane improvers, cosolvents, package compatibilities, and lubricity additives and antistatic additives.

The co-additives may be added to the additive composition at the same time as any of the components (a), (b) and (c) or at different times.

The additive concentrate composition (second aspect of the invention)

The concentrate comprises either the additive as defined above, or the reaction product as defined therein, in admixture with a compatible solvent therefor.

Concentrates comprising the additive in admixture with a carrier liquid (e.g. as a solution of a dispersion) are convenient as a means for incorporating the additive into bulk oil such as distillate fuel, which incorporation may be done by methods known in the art. The concentrates may also contain other additives as required and preferably contain from 3 to 75 wt %, more preferably 3 to 60 wt %, most preferably 10 to 50 wt % of the additive preferably in solution in oil. Examples of carrier liquid are organic solvents including hydrocarbon solvents, for example petroleum fractions such as naphtha, kerosene, diesel and heater oil; aromatic hydrocarbons such as aromatic fractions, e.g. those sold under the 'SOLVESSO' tradename; alcohols and/or esters; and paraffinic hydrocarbons such as hexane and pentane and isoparaffins. The carrier liquid must, of course, be selected having regard to its compatibility with the additive and with the oil.

The additives of the invention may be incorporated into bulk oil by other methods such as those known in the art. If co-additives are required, they may be incorporated into the bulk oil at the same time as the additives of the invention or at a different time.

The fuel oil composition (third aspect of the invention)

The fuel oil composition comprises either the additive or concentrate composition defined above, or the reaction product and optionally additional additives as defined above, in admixture with a major proportion of fuel oil.

The fuel oil may be a hydrocarbon fuel such as a petroleum-based fuel oil for example kerosene or distillate fuel oil, suitably a middle distillate fuel oil, i.e. a fuel oil obtained in refining crude oil as the fraction between the lighter kerosene and jet fuels fraction and the heavier fuel oil fraction. Such distillate fuel oils generally boil within the range of about 100° C. to about 500° C., e.g. 150° to about 400° C., for example, those having a relatively high Final Boiling Point of above 360° C. (by ASTM-D86). Middle distillates contain a spread of hydrocarbons boiling over a temperature range. They are also characterised by pour, cloud and CFPP points, as well as their initial boiling point (IBP) and final boiling point (FBP). The fuel oil can comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils, diesel fuels and heating oils being preferred. The diesel fuel or heating oil may be a straight atmospheric distillate, or may contain minor amounts, e.g. up to 35 wt %, of vacuum gas oil or cracked gas oils or both.

Heating oils may be made of a blend of virgin distillate, e.g. gas oil, naphtha, etc. and cracked distillates, e.g. catalytic crack stock. A representative specification for a diesel fuel includes a minimum flash point of 38° C. and a 90% distillation point between 282 and 380° C. (see ASTM Designations D-396 and D-975).

Also, the fuel may be of animal or vegetable oil origin (i.e. a 'biofuel'), or a mineral oil as described above in combination with one or more biofuels. Biofuels, being fuels from animal or vegetable sources, are obtained from a renewable source. Within this specification, the term "biofuel" refers to a vegetable or animal oil or both or a derivative thereof. Certain derivatives of vegetable oil, for example of rapeseed oil, e.g. those obtained by saponification and re-esterification with a monohydric alcohol, may be used as a substituted for diesel fuel.

Vegetable oils are mainly triglycerides of monocarboxylic acids, e.g. acids containing 10–25 carbon atoms and having the following formula:

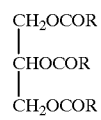

$$\begin{array}{l} CH_2OCOR \\ | \\ CHOCOR \\ | \\ CH_2OCOR \end{array}$$

wherein R is an aliphatic radical of 10–25 carbon atoms which may be saturated or unsaturated.

Generally, such oils contain glycerides of a number of acids, the number and kind varying with the source vegetable of the oil.

Examples of oils are rapeseed oil, coriander oil, soyabean oil, cottonseed oil, sunflower oil, castor oil, olive oil, peanut oil, maize oil, almond oil, palm kernel oil, coconut oil, mustard seed oil, beef tallow and fish oils. Rapeseed oil, which is a mixture of fatty acids partially esterified with glycerol, is preferred as it is available in large quantities and can be obtained in a simple way by pressing from rapeseed.

Examples of derivatives thereof are alkyl esters, such as methyl esters, of fatty acids of the vegetable or animal oils. Such esters can be made by transesterification.

As lower alkyl esters of fatty acids, consideration may be given to the following, for example as commercial mixtures: the ethyl, propyl, butyl and especially methyl esters of fatty acids with 12 to 22 carbon atoms, for example of lauric acid, myristic acid, margaric acid, palmitic acid, palmitoleic acid, stearic acid, oleic acid, elaidic acid, petroselic acid, rininoleic acid, elaeostearic acid, linolenic acid, eicosanoic acid, gadoleic acid, docosanoic acid or erucic acid, which have an iodine number from 50 to 150; especially 90 to 125. Mixtures with particularly advantageous properties are those which contain mainly, i.e. for at least 50 wt % methyl esters of fatty acids with 16 to 22 carbon atoms and 1,2 or 3 double bonds. The preferred lower alkyl esters of fatty acids are the methyl esters of oleic acid, linoleic acid, linolenic acid, linolenic acid and erucic acid.

Commercial mixtures of the stated kind are obtained for example by cleavage and esterification of natural fats and oils by their transesterification with lower aliphatic alcohols. For production of lower alkyl esters of fatty acids it is advantageous to start from fats and oils with high iodine number, such as, for example, sunflower oil, rapeseed oil, coriander oil, castor oil, soyabean oil, cottonseed oil, peanut oil or beef tallow. Lower alkyl esters of fatty acids based on a new variety of rapeseed oil, the fatty acid component of which is derived to more than 80 wt % from unsaturated fatty acids with 18 carbon atoms, are preferred.

The effective concentration of the reaction product in the oil may for example be in the range of 1 to 5,000 ppm (active ingredient) by weight per weight of fuel, for example 10 to 5,000 ppm such as 25 to 2500 ppm (active ingredient) by weight per weight of fuel, preferably 50 to 1000 ppm, more preferably 100 to 800 ppm. Where additional additives are also present; the concentration of the additive composition may be correspondingly higher, for example 10 to 10,000 ppm (active ingredient) such as 50 to 5,000 ppm, more preferably 100 to 2,500 ppm.

Other Aspects of the Invention

In relation to the process and method aspects, the fuel oil may be manufactured according to known refinery practices, including appropriate treatment of the various fuel streams by hydrofining or desulphurisation in the case of fuels having sulphur contents below 0.05%, and more especially 0.035% by weight per weight of fuel. Such base fuel oils may deliberately be manufactured with insufficient low temperature properties (for example, a CFPP too high to meet the required fuel specification) or insufficient lubricity properties (as measured, for example, by the High Frequency Reciprocating Rig ('HFRR') test), and subsequently treated with the additive of the invention in order to achieve the properties required by specification or customer applications. Such fuel production processes and methods also provide the refiner or fuel producer with the possibility of cost savings, allowing the diversion of better-performing but more expensive fuel stream into higher-profit applications whilst maintaining adequate fuel quality through the use of performance-enhancing additives.

In a further use aspect of the invention, the additive of concentrate, or reaction product, is used in fuel oil preferably to improve low temperature properties (especially low temperature filterability performance), and/or lubricity performance and/or wax anti-settling performance of the fuel.

In the process, method, use and other aspects of the invention, the preferred embodiments of the reaction product and other additives optionally used therein are those as described under the additive composition aspects of the invention.

The invention will now be described by means of examples only as follows:

EXAMPLE 1

Enhancement of Fuel Oil Low Temperature Properties

A diesel fuel 1, already tested with ethylene-vinyl ester copolymer (additive A) to improve fuel CFPP was further treated with reaction products $B_1$ and $B_2$ according to this invention, to give the results shown in Table 1.

Additive $B_1$: the condensation reaction product of branched $C_9$ alkyl phenol, formaldehyde and salicylic acid, the alkyl phenol and salicylic acid having reacted in a molar ratio of 9:1 (based on a charge ratio of 4:1 with removal of excess unreacted salicylic acid) and the product having an Mn of 1500.

Additive $B_2$: the product $B_1$ reacted with a commercial dihydrogenated tallow amine mixture (a dialkylamine predominating in $C_{16}$ and $C_{18}$ n-alkyl substituents) in a weight ratio of 4:1 ($B_2$:amine), to form the amine salt derivative of the salicylic acid groups.

For comparison, a conventional $C_9$-alkyl phenol formaldehyde condensation product (additive C) was also tested.

TABLE 1

CFPP results in Fuel 1

| Experiment No. | Additive A | (b) Additive B in ppm (w/w) $B_1$ | $B_2$ | (c) Additive C in ppm (w/w) | CFPP (° C.) | % Wax settled |
|---|---|---|---|---|---|---|
| 1 | present | None | | none | −16° C. | 10 |
| 2 | present | None | | 100 | −18° C. | 10 |
| 3 | present | 100 | | 0 | −19° C. | 8 |
| 4 | present | | 100 | 0 | −19° C. | 7 |

The reaction product of the invention showed good CFPP and wax antisettling.

In the wax settling test (conducted at 10° C. below fuel cloud point), a lower % figure indicates less settling, i.e. more even dispersion of the wax throughout the storage vessel.

EXAMPLE 2

Improved Lubricity Performance

The lubricity enhancement provided by the reaction product of the invention was demonstrated in two low-sulphur diesel fuels.

Additives used:

Additive $B_3$: the condensation reaction product of branched $C_9$ alkyl phenol, formaldehyde and salicylic acid, salicylic acid being present in the polymer at the level of 10 mole %.

Additive $B_4$: a reaction product similar to $B_3$ but containing salicylic acid at the level of approximately 20 mole %.

Additive $B_5$: $B_3$ reacted with dicocoamine to give the corresponding salicylate amine salt product.

Additive $B_6$: $B_4$ reacted with dihydrogenated tallowamine to give the corresponding salicylate amine salt product.

Additive C: as specified in Example 1.

The HFRR (High Frequency Reciprocating Rig) test, run at 60° C. was used to measure the lubricity enhancement.

| | HFRR average wear scar (μm) | |
|---|---|---|
| Additive @ 100 ppm a.i. | Fuel 2 | Fuel 3 |
| None | 560 | 549 |
| Additive C | 550 | 534, 539 |
| Additive $B_3$ | 360 | 523, 469 |
| Additive $B_4$ | 290 | Not tested |
| Additive $B_5$ | 360, 385, 325 | 468 |
| Additive $B_6$ | 367 | 386 |

The reaction products $B_3$ to $B_4$ inclusive demonstrated excellent lubricity enhancement.

What is claimed is:

1. A fuel oil composition having improved lubricity property which contains an additive compositions comprising a lubricity improving amount of the reaction product obtained by the condensation reaction between
   (i) at least one aldehyde or ketone or reactive equivalent thereof,
   (ii) at least one compound comprising one or more aromatic moieties, bearing substituent selected from the group consisting of at least one substituent of the formula —$XR^1$ at least one further substituent —$R^2$, wherein
   X represents oxygen or sulphur,
   $R^1$ represents hydrogen or a moiety bearing at least one hydrocarbyl group having 12–24 carbon atoms; and
   $R^2$ represents a hydrocarbyl group and contains less than 18 carbon atoms when linear, and
   (iii) at least one further compound comprising one or more aromatic moieties bearing at least one substituent of the formula —$XR^1$ and at least one further substituent —$R^3$, wherein:
   X represents oxygen or sulphur,
   $R^1$ represents hydrogen or a moiety bearing at least one hydrocarbyl group having 12–24 carbon atoms; and
   $R^3$ represents a $COOH_1$ or —$SO_3H$ group, and
   wherein X and R1 in reactants (ii) and (iii) may be the same or different.

2. The composition of claim 1, wherein (ii) comprises at least one aliphatic hydrocarbyl-substituted phenol.

3. The composition of claim 1, wherein (iii) comprises salicylic acid.

4. The composition of claim 1 wherein (ii) comprises at least one alkyl phenol, the alkyl substituent containing no more than 15 carbon atoms, and (iii) comprises salicylic acid.

5. The composition of claim 1, wherein the product is further reacted with an amine bearing at least one hydrocarbyl substituent.

6. The composition of claim 5, wherein the product is reacted with the amine to form an amine salt derivative thereof.

7. The composition of claim 5 wherein the amine is an alkyl or dialkyl amine.

8. The composition of claim 7 wherein the amine is selected from dihydrogenated tallow amine, dicocoamine, or mixtures thereof.

9. The composition of claim 4, wherein the product is further reacted with an amine bearing at least one hydrocarbyl substituent.

10. The composition of claim 5, which additionally comprises at least one ethylene polymer.

11. The composition of claim 10, wherein at least one polymer is an ethylene-unsaturated ester copolymer.

* * * * *